United States Patent Office 3,532,275
Patented Oct. 6, 1970

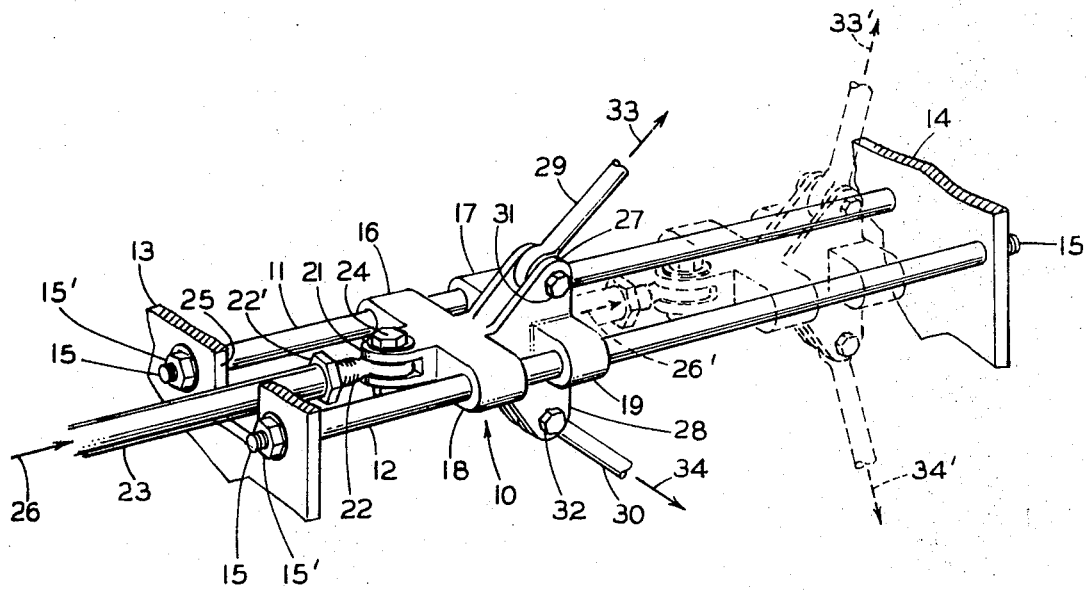
FIG.-1-
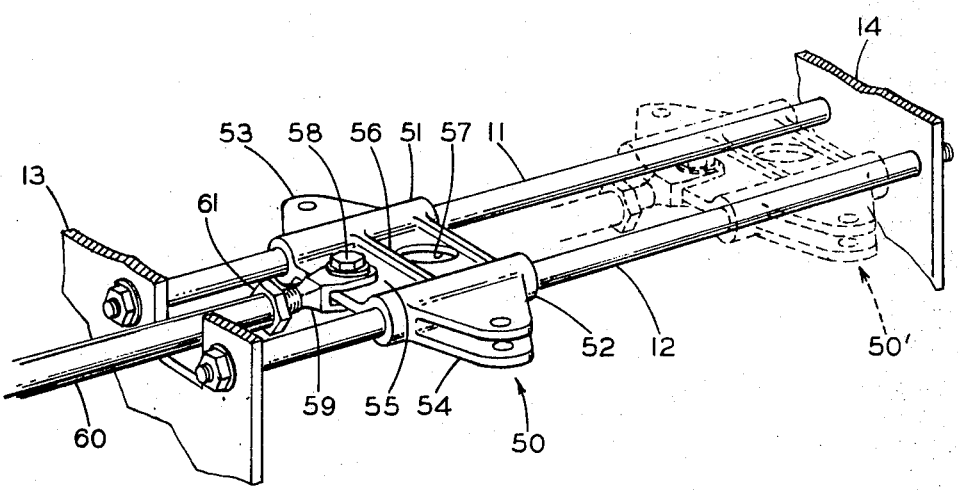
FIG.-2-

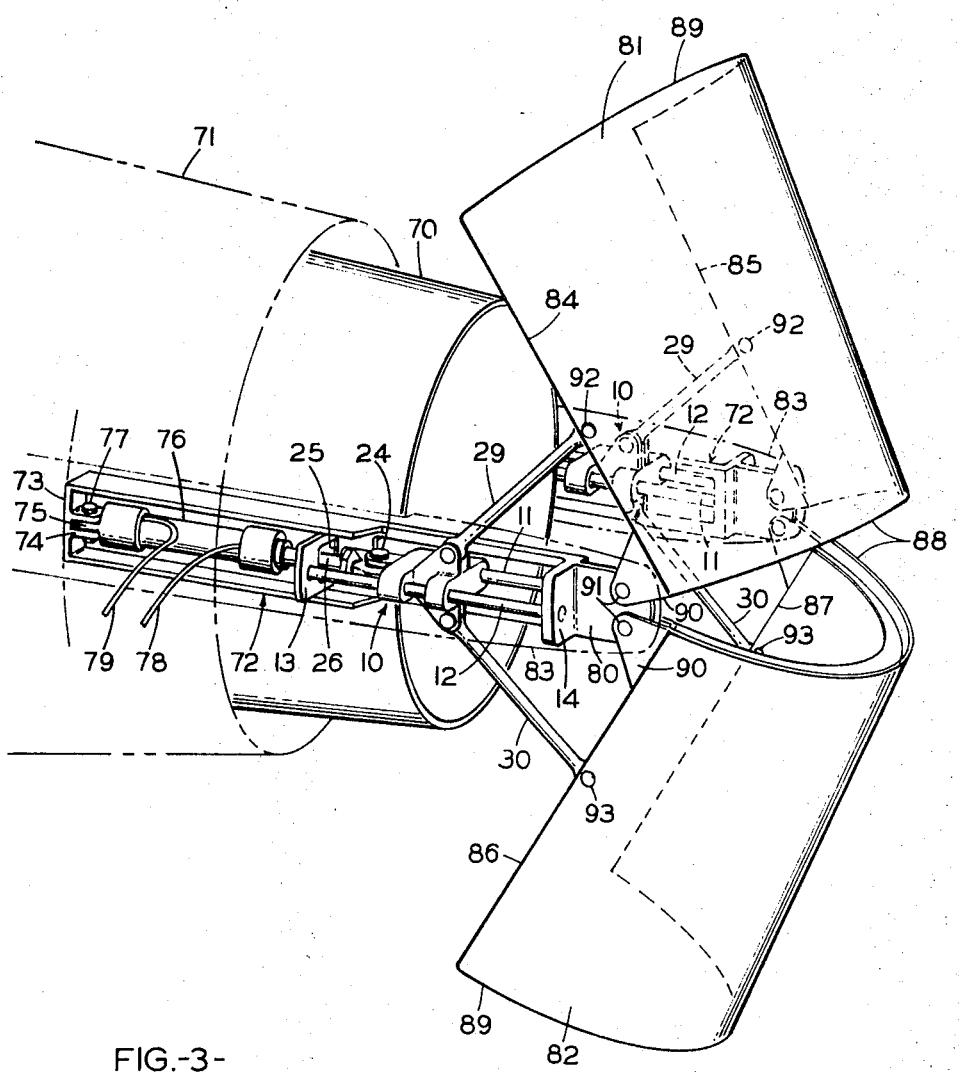
FIG.-3-

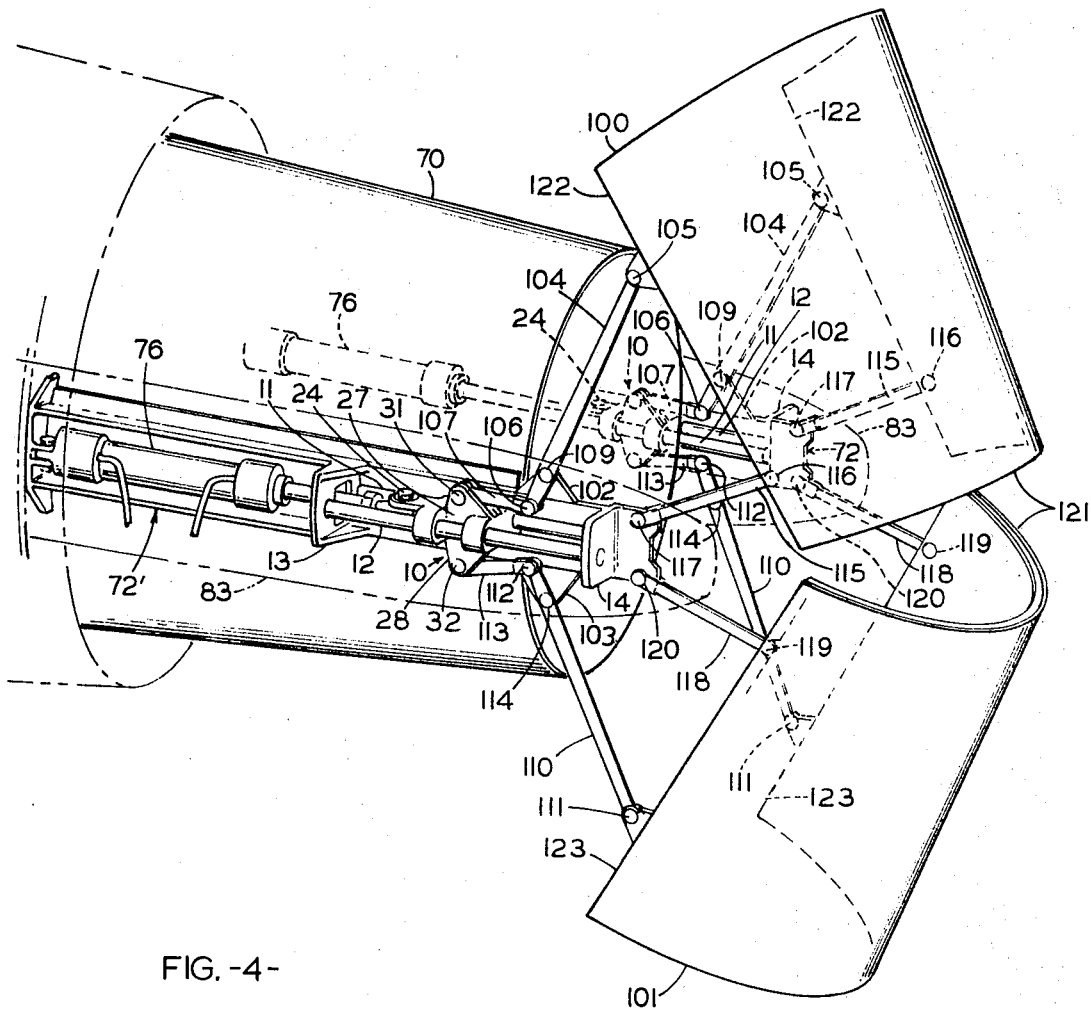
FIG. -4-

3,532,275
JET REVERSER DRIVE SYSTEM
Felix Hom, La Mesa, and Dale W. R. Lawson, Bonita, Calif., assignors to Rohr Corporation, Chula Vista, Calif., a corporation of Delaware
Filed Nov. 9, 1967, Ser. No. 681,790
Int. Cl. B64c 15/04
U.S. Cl. 239—265.33       6 Claims

ABSTRACT OF THE DISCLOSURE

A unitary bogie or carriage structure having spaced bearing supports for sliding movement of the bogie along spaced rod or tubular members provides a low friction, anti-seizing, anti-galling force transfer medium for applying actuating forces to the driving links of exhaust gas deflecting doors in a thrust reverser system. The link drive bogie mechanism is applicable for use with various door movements such as translational-rotational and hinge pivot axis movements of the doors between their stowed and deployed positions.

BACKGROUND OF THE INVENTION

This invention relates generally to thrust reverser systems which employ target type doors, or blocker type doors with cascades, or other thrust deflecting devices for use on aircraft engines and more particularly to improvements in the link drive mechanisms for moving the doors between their stowed and deployed positions in relation to the exhaust nozzle affixed to the tailpipe of the engine.

Thrust reversers of the target dor type conventionally are either vertically or horizontally oriented with the exhaust gases from the tailpipe nozzle being directed by the deployed doors to opposite sides of the engine nacelle and forwardly thereof to thus provide a means of decelerating the aircraft during a landing roll. When in their stowed position, the doors form parts of the aft most portion of the nacelle fairing.

Various slide, pivot, linkage, and other movable support mechanisms and systems have been employed to support the doors for movement between their stowed and deployed positions in response to driving forces applied thereto by suitable means such as hydraulic cylinder actuators. In one case hereinafter more fully to be described, for example, the doors are mounted on fixed pivots and each driven by a pair of links in a hinge type of movement between the stowed and deployed positions of the doors. In another example, also more fully to be described infra, each door is supported on a four bar linkage in which two of the links of each door are driven to move the doors in a translational-rotational movement between their stowed and reverser positions.

Heretofore, various mechanisms such as slides, ways, guide tracks, and roller arrangements have been employed to apply the driving forces from the actuators to the driving links for the doors. While such mechanisms normally are capable of effecting the required movement of the doors, they have not been found to be entirely satisfactory in service because of the inordinate bulk and weight of the parts and the excessive friction therebetween. The parts of such mechanisms, moreover, tend to seize and gall in use with resultant malfunctioning of the parts, and this not only increases the hazzard of failure in service but renders the parts subject to permanent deformation requiring replacement and repair.

SUMMARY OF THE INVENTION

In accordance with the arrangement of the present invention, a simple, low bulk, low weight, low friction, anti-galling, anti-seizing link drive mechanism is provided in the form of a unitary bogie or carriage structure which is mounted for sliding movement along spaced cylindrical shafts such as rods or tubes, there being two such bogie and spaced shaft support arrangements disposed respectively on diametrically opposed sides of the engine exhaust nozzle or, alternatively, only one such bogie and shaft arrangement may be disposed on only one side thereof. The bogie arrangement affords elongated or spaced sleeve type bearings disposed along the shaft supports and further affords apertured lugs for pivotal driving connections with the door actuator and drive links, the disposition of the driving forces being such that friction between the parts is greatly reduced and the tendency of the parts to seize and gall is substantially obviated.

The bogie shaft supports are fixed in spaced parallel relation on mounting brackets which are suitably secured as by welding or bolting to the nozzle which thus becomes on intergrated part of the reverser system, the nozzle being bolted or otherwise secured in the usual manner to a terminal flange on the engine tailpipe. The mounting brackets also provide hinge connections with the doors or pivotal connections with their link supports, as the case may be, depending on the nature of the door movements, whether hinged or translational-rotational. In either case the doors close in stowed position against the mounting brackets which, together with their supported bogie assemblies, are enclosed by fairing members which constitute reward extensions or so-called islands on the engine nacelle.

OBJECTS OF THE INVENTION

A broad object of the present invention therefore is to provide improvements in the link drive mechanisms for the exhaust deflecting devices of aircraft engine thrust reversers to reduce weight and bulk of the parts, to reduce friction between the parts, and to substantially obviate any tendency of the parts to gall and seize.

Another object is to provide an anti-friction, anti-seizing, and anti-galling link drive bogie arrangement which may be used with thrust reverser systems having different modes of door movements such as hinge and translational-rotational movements.

Another object is to provide a bogie arrangement as aforedescribed in which the bogie is a simple unitary structure having a simple spaced shaft support.

Still another object is to provide a bogie arrangement as aforedescribed in which the bogie support structure also affords the door hinge or link pivot supports, as the case may be.

Still a further object is to provide a target door type thrust reverser system for a jet aircraft engine in which the doors, their link drive bogies, and bogie supports are are all integrated with the engine nozzle for attachment therewith as a unitary structure to the terminal flange on the engine tailpipe.

Still other features, advantages and objects of the invention will become more fully apparent as the description thereof proceeds in reference to the accompanying drawings.

BRIEF DESCRIPTION OF THE DRAWINGS

FIG. 1 is an isometric view of the link drive bogie and its spaced shaft support;

FIG. 2 is a view similar to FIG. 1 and showing a modification of the link drive bogie;

FIG. 3 is a schematic view of a hinged target door type thrust reverser system utilizing the link drive bogie arrangement of FIG. 1; and FIG. 4 is a view similar to FIG. 3 showing a four bar linkage type of target door thrust reverser utilizing the link drive bogie arrangement of FIG. 1.

THE SPECIFICATION

Referring now to the drawings for a more complete understanding of the invention and first more particularly to FIG. 1 thereof, the numeral 10 generally designates a bogie or carriage which is a unitary structure in the form of a casting or forging. The bogie is slidably supported for movement along a pair of spaced parallel elongated cylindrical shafts 11 and 12 which, for the purpose, may be tubes, rods, or like members of cylindrical cross section. In the arrangement disclosed, shafts 11 and 12 are tubes which are maintained in the required mutually spaced parallel relation by spaced, fixed members 13 and 14 to which tubes are secured in any suitable manner, as by the threaded bolt and nut fasteners 15 and 15'. In this arrangement, the tubular shafts 11 and 12 also serve as spacer posts, the bolts 15 extending through the tubes and through suitable openings in the members 13 and 14, and the fasteners serve to tighten the members 13 against the ends of the tubular shafts, thereby to provide a rigid slide support structure for the bogie.

Bogie 10 comprises laterally extending spaced pillow block portions 16 and 17 which slidably engage shaft 11 and similar oppositely disposed pillow block portions 18 and 19 which slidably engage shaft 12. These pillow block portions are bored or otherwise machined to provide simple pillow block bearings for receiving the shafts individual thereto in a sliding fit therewith. It will be understood that sleeve bearings or other more sophisticated types of bearings may be inserted in the pillow block structure, as required, to provide the slide-bearing support.

Bogie 10 also comprises a forked or clevised lug 21 which extends longitudinally of the bogie midway between the spaced rods 11 and 12. Its bifurcated region, moreover, is disposed substantially within the plane of the shafts to receive the apertured connector 22 which makes the usual lock nut 22' secured threaded connection with an actuator rod 23. Connector 22 is suitably pivotally secured to the clevis lug 21 by the usual clevis pin or bolt 24. The actuating rod 23 is thus also disposed substantially within the plane of shafts 11 and 12, and is insertable through an opening 25 provided in the fixed shaft support member 13 to make connection with the bogie via connector 22. The actuating force depicted by the arrow 26 is thus applied by way of the actuator rod 23 to the bogie 10 centrally of the shafts 11 and 12 and in the plane thereof, all in a manner best adapted to assure minimum friction between the parts and negligible seizing, or galling action between the bogie bearings and its shaft supports 11 and 12 as the bogie is moved slidably along the shafts in response to the driving force 26.

Bogie 10 also comprises oppositely disposed and laterally extending apertured and forked or clevised lugs 27 and 28 which make pivotal connection respectively with the apertured drive links 29 and 30 by means of the usual clevis pins 31 and 32. The bifurcated regions of lugs 27 and 28 lie midway between the shafts 11 and 12 and substantially within a plane including the axis of the actuator drive pin 24 whereby the forces applied to the drive links 29 and 30, depicted by the arrows 33, are disposed with said plane, and vectorially balance out therewithin. The result of this force distribution and balance is than any tendency for the bogie bearings to seize or gall upon the shafts is greatly minimized or substantially obviated notwithstanding changes in position of the bogie along the shafts such as movement of the bogie to the position shown in dashed lines wherein the bogie is designated by the reference character 10'. It will be understood that the angular positions of drive links 29 and 30 change symmetrically as the bogie moves along the shafts 11 and 12 and that the forces on the drive links thus balance out vectorially for any position of the bogie along the line of movement thereof, the rod and link forces for position 10' of the bogie respectively being designated 26', 33' and 34'.

In FIG. 2 there is disclosed a bogie arrangement in which a bogie structure generally designated 50 is similar to the bogie 10 of FIG. 1. In the FIG. 2 arrangement, the same shafts 11 and 12 and fixed supports 13 and 14 are employed. In this case, however, bogie 50 has single pillow block portions 51 and 52 individual to the shafts 11 and 12 respectively. As in the arrangement of FIG. 1, the pillow block portions 51 and 52 may be simply bored or otherwise machine to provide the slide-bearing surfaces for interfitting engagement with the shafts 11 and 12.

Pillow block portions 51 and 52 respectively have laterally extending forked or clevised lugs 53 and 54 which are bifurcated and apertured to receive driving links much in the same manner as the links 29 and 30 of FIG. 1 are pivotally engaged by their respective lugs 27 and 28. In the case of FIG. 2, however, the bifurcated regions of lugs 53 and 54 lie within the plane of rods 11 and 12, and the driving forces applied to the links secured to the lugs 34 and 35 are thus resolved in the common plane of these links and the actuating rod 23, the link forces balancing out as in the case of FIG. 1, when the links are angularly disposed symetrically with respect to the axis of the driving rod 23 for different positions of movement of the bogie 50 along the shafts such as to the dotted line position designated generally by the numeral 50'.

Bogie 50 comprises a central web portion 55 which extends between the pillow block portions 51 and 52, and this connection between the pillow block portions is strengthened by a gusset 56. Web 55 has a large opening 57 to reduce the weight of the bogie. Web 55 also has another centrally disposed opening for receiving a clevis pin 58 which serves to secure a conventional clevis 59 to the web. Clevis 59 makes a threaded connection with the actuating rod 60 in the usual manner, and this connection is secured by the usual lock nut 61. The axis of rod 60 is thus disposed within the plane of the axes of shafts 11 and 12 and the pivotal connection 58 of the rod with the bogie 50 is disposed midway between the axes to assure that the forces involved are resolved within this plane.

Referring now first to FIG. 3 the nozzle of an aircraft engine is designated 70 and the engine nacelle is designated 71. It will be understood that the nacelle encloses a tailpipe (not shown) to the terminal flange of which the nozzle 70 is bolted in a conventional manner. A pair of bogies 10 are mounted for sliding movement on diametrically opposed sides of the nozzle 70. To this end, each bogie assembly comprises a bogie mounting plate or bracket generally designated 72 which has the fixed members 13 and 14 of FIG. 1 integrally formed therewith as flanges. Mounting bracket 72 is formed as a unitary structure such, for example, as a casting or forging, and is secured in any suitable manner as by welding or bolting to the nozzle 70.

Each of the mounting brackets 72 has another flange 73 at its upstream end which provides a clevis 74 to which the apertured end 75 of a hydraulic cylinder actuator 76 is pivotally secured as by the clevis pin 77. Each actuator 76 on each side of the nozzle comprises an actuator rod 26, which has been described hereinbefore in detail in connection with the showing of FIG. 1, and also comprises hydraulic stow and deploy lines 78 and 79 respectively.

The downstream end portions 80 of the bogie mounting brackets 72 provide hinge supports for a pair of target doors 81 and 82 which, in this case, are oriented in a vertical plane with respect to the normal ground position of the aircraft. Doors 81 and 82 are generally frusto-conical in configuration, and when the doors are pivotally moved into their stowed positions around the nozzle 70, they form the aftmost portion of the nacelle fairing except for the regions occupied by the bogie mounting brackets 72. The bogies 10 and their associated operating mechanism thereat are enclosed respectively by a pair of so-called stangs 83 which completes the fairing around the nozzle. The doors thus close against islands afforded by the bogie mounting brackets and associated structure disposed on the diametrically opposite sides of the nozzle rather than against the door edges 84, 85 and 86, 87 which generally extend in spaced parallel relation longitudinally of the engine when in their stowed positions around the nozzle. The downstream ends 88 of the doors are canted with respect to their respective upstream ends 89 such that when the ends 88 are moved together in the extreme thrust reverser position of the doors the same are angularly disposed with respect to the engine axis at an angle of the order of 60° such that the exhaust gases are deflected forward of the engine and to opposite sides of the nacelle 71 to produce a reverser thrust.

Each of the doors 81 and 82 on each side thereof has an apertured hinge flange or bracket 90 which is pivotally secured as by a hinge pin 91 to the rearwardly end portion 80 of the bogie mounting bracket. The hinge brackets 90 extend sufficiently from the longitudinal edges 84–87 so that the pivot axes 91 are disposed in closely spaced adjacency to a plane which passes through the axes of the bogie support rods 11 and 12 which, in turn, lie within an axial plane of the nozzle 70.

The drive links 29 and 30 of which there is a set pivotally connected to each of the diametrically opposed bogies 10 are the same as aforedescribed in connection with the showing of FIG. 1. These links are also pivotally connected at their opposite ends to the doors 81 and 82, as by the pins 92 and 93, respectively, these pivotal connections being disposed in near adjacency to the longitudinal edges 84, 85 and 86, 87 of the doors.

From the foregoing it will now be apparent that a coordinated sliding movement of the diametrically opposed bogies 10 along their respective shaft supports 11 and 12 will move the doors 81 and 82 between their stowed and reverser positions and that these movements are accomplished by means of simple, light weight, easily accessible drive link bogie mechanisms which produce a minimum of friction and substantially obviate any tendency of the moving parts to seize or gall. It will be understood, moreover, that whereas an arrangement has been described in which bogie drives are employed on both sides of the nozzle, that the doors may be moved effectively and the same advantages obtained from the bogie drive arrangement when only one bogie is used on only one side of the nozzle.

In FIG. 4 a thrust reverser arrangement generally similar to that of FIG. 3 is disclosed except that the doors 100 and 101 of FIG. 4 are moved translationally and rotationally between their stowed and deployed positions with respect to the nozzle 70 by a linkage system comprising a four bar linkage for each of the doors. This four bar linkage arrangement is generally the same as that disclosed in Pat. No. 2,968,150 of K. W. Goebel et al. for Jet Engine Exhaust Sound Suppressor and Thrust Reverser, which patent is assigned to the assignee of the instant application.

In the arrangement of FIG. 4 the bogie mounting brackets designated 72' are generally of the same configuration as the mounting brackets of FIG. 3 and are similarly secured to diametrically opposed sides of the nozzle as in that arrangement. Each mounting bracket 72', however, has oppositely disposed upper and lower apertured lugs 102 and 103 for a purpose presently to appear.

The upper door 100 has a pair of forward links 104 which are pivotally secured each at one end thereof to the doors as depicted at 105. The other end of each of links 104 is pivotally connected, as depicted at 106, to a short actuating link 107 which, in turn, is pivotally connected at its forward end to the forked lug 27 of its associated bogie 10 by pin 31, both bogies 10 being of the same configuration and construction as disclosed in FIGS. 1 and 3.

Forward links 104 of upper door 100 are pivotally connected, as depicted at 109, to the aforementioned upper apertured lug 102 of the mounting brackets 72', this pivotal connection being disposed in spaced adjacency to pivots 106 of links 104. Forward links 110 of lower door 101 similarly are each pivotally connected at one end thereof to the door as depicted at 111. The other ends of these links similarly are pivotally connected as at 112 to short, actuating links 113 which, at their forward ends, are pivotally connected respectively to the forked lugs 28 of their associated bogie 10 by pivot 32. Links 110, in spaced adjacency to their pivots 112, are pivotally connected to the lower apertured lugs 103 of mounting brackets 72' as depicted at 114.

The rear links 115 for the upper door are each pivotally connected at one end thereof to the door as depicted at 116 and at the other end thereof to the mounting brackets 72', as depicted at 117. Similarly, rear links 118 of the lower door 101 are pivotally connected to the door each at one end thereof, as depicted at 119, and at the other end thereof to the mounting brackets 72', as depicted at 120.

In the movement of doors 100 and 101 between the stowed and deployed positions, the same are driven by the actuators 76 acting in unison to drive the bogies 10 slidably along their respective shaft supports 11, 12. The drive links 107 and 113 drive the crank arm links 104 and 110 to thus move the doors translationally and rotationally between the deployed and stowed positions as the doors pivot about their pivotal connections with the links 104, 110, 115 and 118. In the extreme deployed position of the doors, the ends 121 of the same come together as in the arrangement of FIG. 3, and in the stowed position about nozzle 70, the edges 122 of the upper door 100 and the comparable edges 123 of the lower door 101 move into engaging relation with the edges of the mounting brackets 72' and the fairing 83 thereabout generally in the same manner as in the arrangement of FIG. 3.

The drive links 107 and 113 and the coacting crank arm links 104 and 110, on each side of the nozzle, lie in the same plane with the pivot pin 24 which lies at the point of driving connection of the associated actuator 76 such that all of the forces involved in the driving movements of the doors are resolved and balance out in a common plane in the manner aforedescribed in connection with the description of the showing of FIG. 1 whereby the bogie, for the purposes of the arrangement of FIG. 4, is likewise driven slidably with a minimum of friction and with all tendency of the parts to seize or gall being substantially obviated.

From the foregoing it should now be apparent that drive link bogie arrangements have been provided which are well adapted to fulfill the aforestated objects of the invention. While certain examples of the invention have been disclosed such as the application of the bogie drives to target door type reverser arrangements, it will be apparent that other applications are also possible such, for example, as in the use of the bogie drives to move blocker doors and other exhaust gas deflecting devices. It will be understood, moreover, by those skilled in the art to which the invention relates or most closely appertains that the invention may be practiced in other ways without departing from the spirit and scope thereof.

Having thus described the invention, what is claimed as new and useful and desired to be secured by Letters Patent of the United States is:

1. An aircraft jet engine thrust reverser assembly for mounting on the nozzle of a jet aircraft engine comprising mounting bracket means for mounting securely in fitted relation on such nozzle on two diametrically opposite sides of the nozzle, a slide guide track element fixed mounted on said mounting bracket means on one of said sides of the nozzle, a pair of substantially similar exhaust gas thrust reverser doors shaped to fit in stowed position in complementary relation about the engine nozzle, means movably connecting each side of each door to said mounting bracket means on each of said diametrically opposite sides of the nozzle for swinging movemnet of the doors between said stowed position clear of the path of exhaust gases from said nozzle, and deployed position rearwardly of said nozzle and in the path of said exhaust gases, a bogie mounted for guided, slidable, non-rotative movement along said slide guide track element, a reversible, power driven actuator operably connected between said bogie and its mounting bracket means for power actuation of said bogie in selected directions along its slide guide track element, and thrust link means operably connected between said bogie and each thrust reverser door for controlled movement of said doors between their stowed and deployed positions upon actuation in selected directions of said bogie actuator.

2. The combination as in claim 1 wherein two slide guide track elements are fixedly mounted one on each mounting bracket element, a bogie is mounted on each slide guide track element, and an actuator is operably connected between each bogie and its mounting bracket means.

3. The combination as in claim 1 wherein the doors have hinge connections to terminal portions of said diametrically opposite mounting bracket means.

4. The combination as in claim 1 wherein each of the doors has a four-bar linkage support including a first pair of links pivotally connected to the door at one end of each link and pivotally connected to one of said mounting brackets at the other end of each link, and a second pair of links pivotally connected to the door at one end of each link and pivotally connected to the other of said mounting brackets at the other end of each link.

5. The combination as in claim 4 wherein a drive link for each door is pivotally connected to one of said first pair of links of the four-bar linkage of the door.

6. The combination as in claim 1 wherein the mounting brackets are formed as a unitary structure with the engine nozzle.

References Cited

UNITED STATES PATENTS

| | | | |
|---|---|---|---|
| 2,704,436 | 3/1955 | Short et al. | 239—265.37 |
| 2,869,058 | 1/1959 | Poland | 74—471 |

LLOYD L. KING, Primary Examiner

U.S. Cl. X.R.

239—265.37